March 21, 1961 T. VIGMOSTAD 2,975,654
BRAKE LEVER ASSEMBLY
Filed July 11, 1958 3 Sheets-Sheet 1

INVENTOR.
TRYGVE VIGMOSTAD
BY
Barnes, Kisselle, Raisch & Choate
ATTORNEYS

March 21, 1961    T. VIGMOSTAD    2,975,654
BRAKE LEVER ASSEMBLY

Filed July 11, 1958    3 Sheets-Sheet 2

INVENTOR.
TRYGVE VIGMOSTAD
BY
Barnes, Kisselle, Raisch & Choate
ATTORNEYS

March 21, 1961 T. VIGMOSTAD 2,975,654
BRAKE LEVER ASSEMBLY
Filed July 11, 1958 3 Sheets-Sheet 3

INVENTOR.
TRYGVE VIGMOSTAD
BY
Barnes, Kisselle, Raisch & Choate
ATTORNEYS

United States Patent Office 2,975,654
Patented Mar. 21, 1961

2,975,654
BRAKE LEVER ASSEMBLY

Trygve Vigmostad, Detroit, Mich., assignor to Mount Clemens Metal Products Company, Mount Clemens, Mich., a corporation of Michigan Filed July 11, 1958, Ser. No. 747,945

5 Claims. (Cl. 74—520)

This invention relates to a parking brake lever assembly and more particularly to a parking brake lever assembly of the type designed to be foot operated.

Parking brakes of present-day automobiles are usually cable operated and designed such that the parking brake is fully applied when the tension applied to the cable increases to a predetermined value; for example, 320 pounds in one make of car. In accordance with present-day design, the brake actuating cable is arranged to be tensioned by means of a foot-operated brake lever; and in a conventional parking brake lever assembly, the force applied to the foot-operated brake lever to apply the brake progressively increases throughout the range of travel of the foot pedal.

Such an arrangement has at least one disadvantage in that the foot pedal load required to apply the brake fully may be excessive for some drivers; and therefore, it sometimes happens that the parking brake is not fully applied by the operator.

It is an object of this invention to provide a parking brake lever assembly that is designed such that the foot pedal load required to apply the brake is generally uniform through the range of travel of the foot pedal. This is accomplished by a particular linkage between the brake actuating cable and the foot-operated brake lever that increases the mechanical advantage in a progressive manner in relation to the travel of the foot pedal.

Another object of the present invention is to provide a brake lever assembly which automatically compensates for wear in the brake so that the adjustment of the brake due to wear is rendered unnecessary. This object is accomplished by incorporating in the brake actuating cable a spring link which is designed to yield when the load applied to the cable corresponds to the cable load required to fully apply the brake.

Another object of the invention is to provide a brake lever assembly which is designed so that it can be actuated only to two positions; namely, one position wherein the brake is fully released and another position wherein the brake is fully applied.

Figures 1, 2:
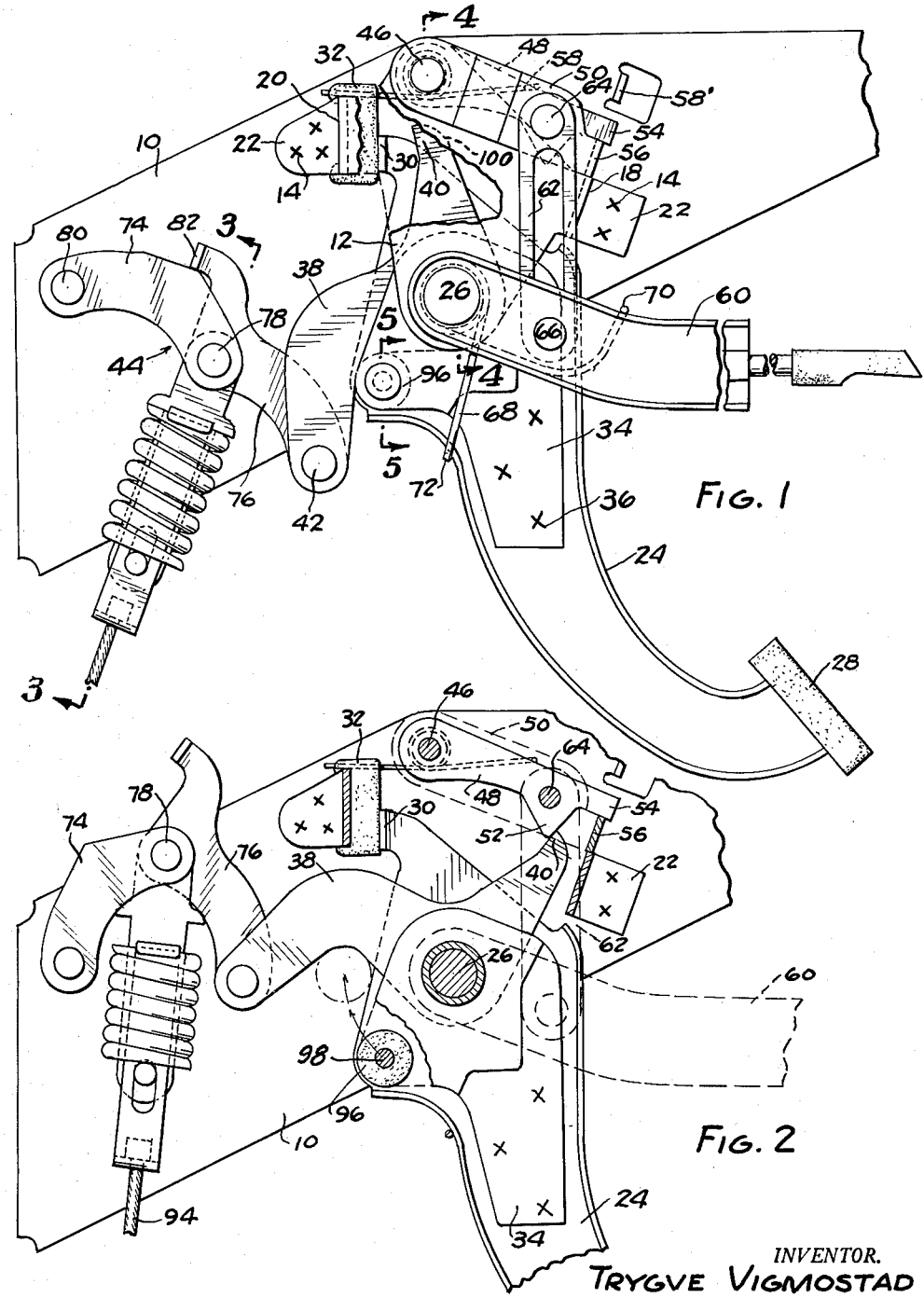
Fig. 1 is a side elevational view with parts broken away showing the brake lever assembly of this invention, the parts being shown in the position they occupy when the brake is released.
Fig. 2 is generally similar to Fig. 1 and shows the parts in the positions they occupy when the brake is applied.
Figure 4:
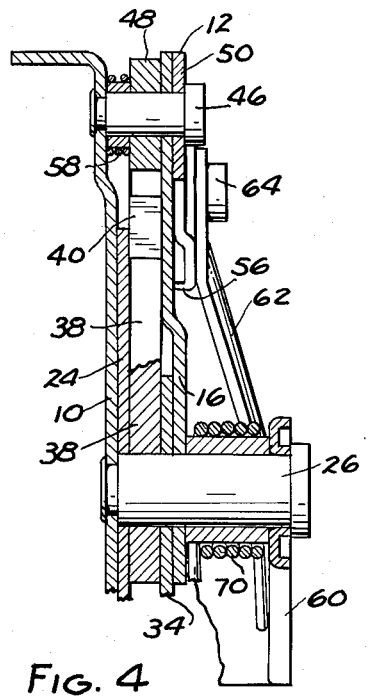
Fig. 4 is a sectional view taken along the line 4—4 in Fig. 1.
Figure 5:
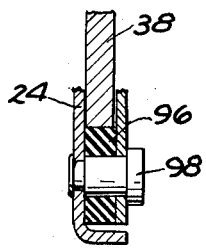
Fig. 5 is a sectional view taken along the line 5—5 in Fig. 1.

Referring to Figs. 1 and 4, the lever assembly of this invention generally includes a plate-like mounting bracket 10 by means of which the brake lever assembly can be securely mounted on a supporting structure of the automobile. A support bracket 12, a portion of which is broken away in Fig. 1, is welded to mounting bracket 10 as at 14. Support bracket 12 has the central portion 16 thereof spaced from the plane of mounting bracket 10 and at opposite ends thereof, the support bracket 12 is bent transversely to the plane thereof as at 18 and 20 to provide pads 22 which, as previously indicated, are welded to mounting bracket 10 as at 14.

An arcuately shaped brake lever in the form of a foot pedal 24 is pivotally supported on a rivet 26 which extends through mounting bracket 10 and the body portion 16 of support bracket 12. At its lower end, pedal 24 is provided with the usual pad 28 to facilitate foot operation of the brake lever. At its upper end, foot pedal 24 is fashioned with a lug 30 which normally abuts against a rubber bumper 32 mounted on the support bracket 12 to limit the pivotal movement of pedal 24 in a counterclockwise direction as viewed in Fig. 1.

A reinforcing plate 34 is welded to the foot pedal as at 36. The portion of plate 34 through which rivet 26 extends is spaced slightly from the adjacent face of foot pedal 24 to accommodate a detent lever 38 which is also pivotally supported on rivet 26 for movement independently of foot pedal 24. Detent lever 38 is generally in the form of a bellcrank having a detent 40 formed at the end of one of its legs and pivotally connected as at 42 at the end of its other leg with a linkage generally designated 44. Between the upper ends of mounting bracket 10 and support bracket 12, there is pivotally supported on a rivet 46 a pawl 48. A pawl release lever 50 is also pivotally supported on rivet 46. Pawl 48 is provided with a depending detent 52 behind which the detent 40 of lever 38 is adapted to engage. The free end of pawl 48 is provided with a lug 54 which is normally engaged on its underside by a transversely bent ear 56 at the end of the pawl release lever 50.

A spiral spring 58 biases pawl 48 in a clockwise direction as viewed in Fig. 1 to a position wherein the lug 54 abuts against ear 56 and ear 56 in turn abuts against the transversely bent shoulder 18 of support plate 12. This limits the pivotal movement of pawl 48 in the clockwise direction. Movement of pawl 48 in the counterclockwise direction is limited by a bumper 58′ struck out of mounting bracket 10.

A manually operable release arm 60 is pivotally supported on rivet 26. Arm 60 is interconnected with the release lever 50 by a link 62. Link 62 is pivotally connected with release lever 50 by a rivet 64 and with arm 60 by a rivet 66. A spiral spring 68 encircling rivet 26 has one end hooked over arm 60 as at 70 and its other end hooked over foot pedal 24 as at 72. Spring 68 normally biases arm 60 in a clockwise direction and foot pedal 24 in a counterclockwise direction to the positions illustrated in Fig. 1.

The linkage generally designated 44 includes a pair of toggle links 74 and 76 which are pivotally connected together at their adjacent ends as at 78. The other end of link 74 is fixedly pivoted on the mounting bracket 10 as at 80. The other end of link 76 is pivotally connected to the detent lever 38 as at 42. Toggle link 76 is formed with a stop 82 engageable with link 74 to limit the movement of the connection 78 in a downward direction as viewed in Fig. 1.

Figure 3:
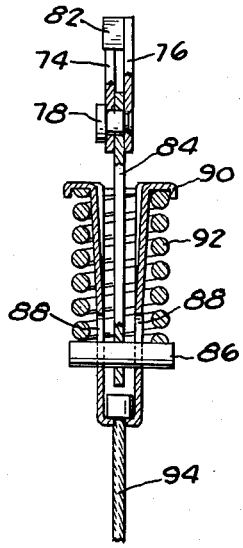
Fig. 3 is a sectional view taken along the line 3—3 in Fig. 1 and showing the details of the spring tension link in the brake actuating cable.

Referring to Fig. 3, the pivotal connection 78 comprises a rivet extending through the adjacent ends of links 74 and 76; and between the ends of these links, there is supported on rivet 78 a link 84 provided with a cross pin 86 at the lower end thereof. Cross pin 86 extends through elongated apertures 88 in the legs of a yoke 90 which provides a spring retainer; and between the upper end of spring retainer 90 and cross pin 86, there is arranged a coiled compression spring 92. To the lower end of spring retainer 90, the brake actuating cable 94 is connected as illustrated. Spring 92 is normally in the expanded condition and is designed such that when the tension on cable 94 reaches a predetermined value (the tension required on cable 94 to insure full application of the parking brake), spring 92 yields and compresses so that the tension on cable 94 is not thereafter substantially increased.

In the released position, the various parts of the brake lever assembly assume the positions illustrated in Fig. 1. In this position, arm 38 is engaged by a rubber bumper 96 which is retained by a rivet 98 between reinforcement plate 34 and the adjacent face of footpedal 24. To apply the brake, the operator pivots foot pedal 24 in a clockwise direction as viewed Fig. 1 by pushing with his foot on pad 28. As pedal 24 swings clockwise, bumper 96 causes detent lever 38 to simultaneously pivot in a clockwise direction. After pedal 24 is swung through a substantial arc, the cam surface 100 on the leading edge of detent 40 engages detent 52 on pwal 48 and pivots the pawl upwardly against the bias of spring 58. The pawl rides upwardly over detent 40 so that the pawl and the detent lever 38 interengage as shown in Fig. 2.

This movement of lever 38 shifts the links 74, 76 to the position illustrated in Fig. 2. Lever 38 thus serves as a link actuator. If, then, the foot pressure is released on pad 28, foot pedal 24 will swing back to the position illustrated in Fig. 1 by reason of the action of spring 68 whereas detent lever 38 will remain in the brake applying position illustrated in Fig. 2. When it is desired to release the brake, the operator swings lever 60 upwardly, which acts through link 62 and release lever 50 to engage lug 54 of pawl 48 and swing it upwardly in a counterclockwise direction to a position wherein the detent 40 of release lever 38 is released from engagement with detent 52 and the release lever 38 thus rotates in a counterclockwise direction from the engaged position shown in Fig. 2 to the released position shown in Fig. 1.

It will be observed that since brake pedal 24 is mounted for pivotal movement on rivet 26 independently of detent lever 38, the foot pedal 24 always returns to the position illustrated in Fig. 1, whether the brake is in the released or applied condition. I consider this a decided advantage in that when the brake is released by lifting lever 60, foot pedal 24 does not suddenly snap back to the position illustrated in Fig. 1, the latter action possibly injuring the shins of the driver.

It will also be observed that detent lever 38 can assume only either one of the two positions illustrated in Figs. 1 and 2. Thus, with this arrangement, the brake is either fully applied or fully released; and the operator is aware of the condition of the brake by the pressure required to swing foot pedal 24. In other words, unless the brake is fully applied, the brake is not applied at all; and as soon as the operator relieves his foot pressure, he is ware of whether or not the brake has been applied.

As mentioned previously, one of the most important features of this invention has to do with the linkage arrangement which results in a progerssively increasing mechanical advantage on the foot pedal 24 as it swings in the brake applying direction. This progressively increasing mechanical advantage is illustrated by a comparison of the relative positioning of the linkage arrangement 44 in Figs. 1 and 2. In Fig. 1, it will be observed that links 74 and 76 are extended or expanded their maximum extent as limited by the lug 82. In this position, the axes of these two links incline relative to one another at an obtuse angle. As the foot pedal swings clockwise, the included angle between links 74 and 76 becomes progressively smaller. At the same time the lever arm between rivet 26 and a line between the two outer pivots of links 74, 76 (the line of force tending to collapse the links) becomes progressively smaller. Even though the lever arm between pivot 26 and pivot 71 increases as the brake is applied, the net effect is a progessively increasing mechanical advantage.

With the various links and levers proportioned generally as shown in the drawings, I have found that the mechanical advantage progressively increases from a ratio of about 1:1 to a ratio of about 5½:1. Considering that the tension on the cable 94 progressively increases, the net result is that the load that has to be applied to the pad 28 of the foot lever starts out at zero and with a short arcuate distance reaches a maximum value which remains substantially uniform throughout the remainder of the foot pedal travel necessary to apply the brakes.

For example, in one make of automobile on which the brake lever assembly of this invention has been applied wherein the total travel of the pad 28 is about 6", I have found that after about 2½" of travel, the foot pedal load reaches a generally uniform value. In that particular application, the cable load necessary to apply the brakes was about 320 pounds. After about 2½" of travel of the foot pedal, the foot pedal load reached a maximum value of about 70 to 75 pounds and remained at that value throughout the remaining travel of the foot pedal.

When the parking brake is new, the tension on the cable 94 will reach its maximum value before the detent 40 of lever 38 engages behind the detent 52 of pawl 48. Spring 92 is designed to yield when this tension is exceeded; and therefore, the load on the foot pedal remains substantially uniform, even when spring 92 is compressed. As the brake wears, cable 94 becomes progressively more slack so that the point in the movement at which spring 92 being to yield is progressively closer to the end of the travel of brake pedal 24. However, until the brake wears to a point where swinging of the foot pedal 24 through an arc necessary to effect interengagement of detents 52 and 40 does not compress the spring 92, no brake adjustment is necessary.

Figure 6:
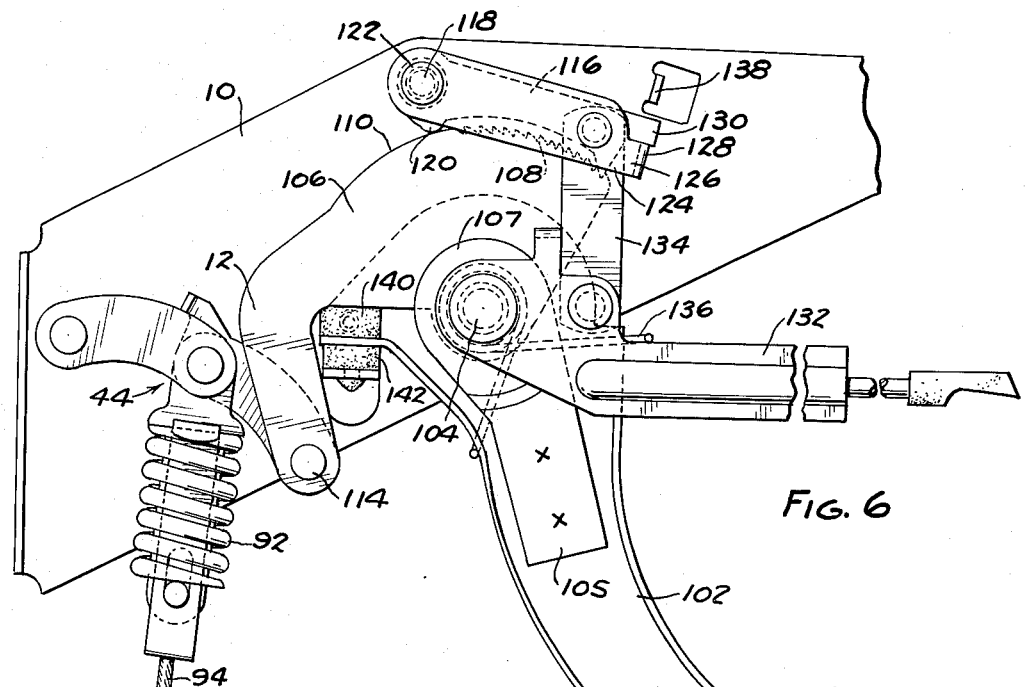
Fig. 6 is a view similar to Fig. 1 and shows a modified form of brake lever assembly embodying the present invention, the parts being shown in the positions they occupy when the brake is released.
Figure 7:
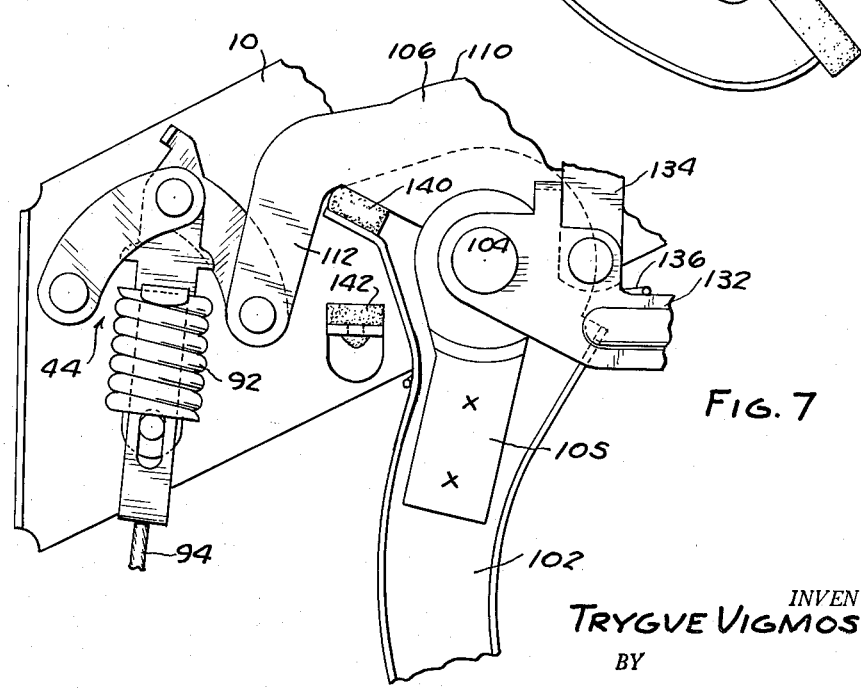
Fig. 7 is a view generally similar to Fig. 6 and shows the parts of the assembly illustrated in Fig. 6 in the positions they occupy when the brake is applied.

The embodiment illustrated in Figs. 6 and 7 employs substantially the same linkage 44 as described above and the same application of spring 92. The primary difference between the arrangement shown in Figs. 6 and 7 as compared with the previous embodiment disclosed resides in the means for retaining the brake in the fully applied position. In the arrangement illustrated in Figs. 6 and 7, the foot pedal 102 which is pivoted on the body bracket 10 as by a rivet 104 has welded to it a reinforcement plate 105. As sector plate 106 is pivoted on rivet 104 between foot pedal 102 and the offset portion 107 of plate 105. Sector plate 106 is fashioned with a ratchet portion 108, an arcuate bearing edge portion 110 concentric about the pivot 104 and a link portion 112 which is connected to the linkage 44 as at 114. A pawl 116 is pivoted on the body bracket 10 as at 118 and has a radial lug 120 frictionally engaging the arcuate bearing portion 110 of sector plate 106.

The radial lug 120 is resiliently biased into engagement with the arcuate bearing edge portion 110 by means of a compressed rubber bushing 122 at the pivot 118. Pawl 116 is provided with a detent 124 adapted to engage the teeth of the ratchet portion 108. Pawl release lever 126 is pivoted on body bracket 10 as at 118 and has a transversely bent end portion 128 normally engaged beneath a lug 130 at the free end of pawl 116. Pawl release lever 126 is interconnected with the manually operable release arm 132 by a link 134. A spring 136 normally biases the foot pedal 102 and the release arm 132 to the positions illustrated in Fig. 6.

In Fig. 6, the brake is illustrated in the released position. When it is desired to apply the brake, foot pedal 102 is swung clockwise to shift the linkage 44 to the position illustrated in Fig. 7. A bumper 140 on pedal 102 engages sector plate 106 to pivot sector plate 106 with the foot pedal when the foot pedal is swung in a clockwise direction. As soon as foot pedal 102 starts to swing clockwise, the frictional engagement between lug 120 and the arcuate bearing edge portion 110 causes pawl 130 to pivot upwardly in a counterclockwise direction as viewed in Fig. 6 against the stop 138 to a position wherein the detent 124 bypasses the teeth of ratchet portion 108. As soon as the pressure on the foot pedal is released and the foot pedal begins to swing counterclockwise under the influence of spring 136, sector plate 106 also tends to pivot in a counterclockwise direction and the frictional engagement between lug 120 and the arcuate bearing edge portion 110 causes pawl 116 to swing downwardly into engagement with the adjacent tooth of the ratchet portion 108 to prevent further counterclockwise pivoting of foot lever 102.

When it is desired to release the brake, release arm 132 is raised and this arm, acting through link 134, lifts pawl 116 to a position wherein detent 124 clears the teeth of ratchet portion 108 and the sector plate 106 swings counterclockwise back to the position illustrated in Fig. 6, in which position it engages bumper 140. Spring 136 biases pedal 102 counterclockwise into engagement with the bumper 142 fixed on mounting bracket 10.

Thus, it will be seen that I have provided a novel design for a parking brake lever assembly. The assembly is designed so that a substantially uniform foot pressure on the brake lever will shift the brake lever from the fully released position to the fully engaged position. In addition, the spring arrangement in the brake actuating cable eliminates the need for adjustment of the brake due to wear and at the same time permits the utilization of a single detent for holding the brake in the fully applied condition.

I claim:

1. In a parking brake lever assembly, the combination of a pivotally supported brake lever, a brake actuating cable, a pivoted latch pawl, a pivotally supported link actuator operated by the brake lever and adapted to be engaged and held by the pawl when the brake lever is swung in the brake applying direction, and an operative connection between said link actuator and said brake actuating cable comprising a pair of links pivotally connected together at one end, the other end of one link being pivoted to a fixed support and the other end of the other link being pivotally connected to said link actuator, said links being inclined to one another at an obtuse angle of less than 180° when the brake is released and to an acute angle when the brake is applied, said last mentioned pivotal connection being located more remote from a line through said fixed pivot and the pivotal axis of the link actuator when the brake is released than when the brake is applied.

2. In a parking brake lever assembly, the combination of a pivotally supported brake lever, a brake actuating cable, a pivoted latch pawl, a pivotally supported link actuator operated by the brake lever and adapted to be engaged and held by the pawl when the brake lever is swung in the brake applying direction, and an operative connection between said link actuator and said brake actuating cable comprising a pair of links pivotally connected together at one end, the other end of one link being pivoted to a fixed support and the other end of the other link being pivotally connected to said link actuator, said links being inclined to one another at an obtuse angle of less than 180° when the brake is released and at an acute angle when the brake is applied, said last mentioned pivotal connection being disposed such that the angle formed between a line extending through the fixed pivot and the pivotal axis of the link actuator and a line through the fixed pivot and the pivotal connection between the link actuator and said other link becomes progressively smaller in response to movement of the link actuator in the brake applying direction.

3. The combination set forth in claim 2 wherein the pawl is adapted to engage and hold the link actuator only in a single predetermined position of the link actuator.

4. The combination set forth in claim 1 wherein said link actuator is pivotally supported at the pivotal axis of the brake lever for pivotal movement independently thereof and including a one-way driving connection between the brake lever and the link actuator, and means biasing the brake lever in a direction counter to the direction in which the brake lever is swung to apply the brake.

5. The combination set forth in claim 4 wherein the pawl is adapted to engage and hold said link actuator only in a single predetermined position of the link actuator.

References Cited in the file of this patent

UNITED STATES PATENTS

| 2,240,783 | Jandus | May 6, 1941 |
| 2,281,467 | Thorp | Apr. 28, 1942 |
| 2,437,396 | McCarthy | Mar. 9, 1948 |
| 2,468,425 | Carpenter et al. | Apr. 26, 1949 |
| 2,555,811 | Peterson | June 5, 1951 |
| 2,709,504 | Mamo | May 31, 1955 |
| 2,884,803 | Willis | May 5, 1959 |
| 2,907,228 | McCarthy | Oct. 6, 1959 |

FOREIGN PATENTS

| 19,534 of 1905 | Great Britain | Sept. 27, 1906 |
| 411,977 | Great Britain | June 21, 1934 |
| 8,835 of 1900 | Great Britain | May 11, 1901 |